US012495114B2

(12) United States Patent
Hayes et al.

(10) Patent No.: US 12,495,114 B2
(45) Date of Patent: Dec. 9, 2025

(54) FRAMEWORK FOR UNIFIED WIRELESS COMMUNICATIONS

(71) Applicant: T-Mobile USA, Inc., Bellevue, WA (US)

(72) Inventors: Jason Wayne Hayes, Lynnwood, WA (US); Yamuna Sai Mukkamala, Bellevue, WA (US); Hamza Hydri Syed, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 333 days.

(21) Appl. No.: 18/351,868

(22) Filed: Jul. 13, 2023

(65) Prior Publication Data

US 2025/0023988 A1 Jan. 16, 2025

(51) Int. Cl.
*H04M 15/00* (2024.01)
(52) U.S. Cl.
CPC .......... *H04M 15/07* (2013.01); *H04M 15/41* (2013.01)

(58) Field of Classification Search
CPC ....... H04M 15/00; H04M 15/07; H04M 15/41
See application file for complete search history.

(56) References Cited

U.S. PATENT DOCUMENTS 10,470,032 B1 * 11/2019 Ziegler ................. H04M 15/06
11,323,856 B2 * 5/2022 Levine .................. H04M 15/66

* cited by examiner

*Primary Examiner* — Tuan H Nguyen
(74) *Attorney, Agent, or Firm* — Lee & Hayes, P.C.

(57) ABSTRACT

System and methods for using a single number for multiple devices supported by distinct network operators are described. A secondary device from a different network operator may be provisioned on a wireless communications network and associated with a primary telephone number that is also associated with one or more other devices so that traffic for the primary telephone number is duplicated to the secondary device. When the secondary device is used for communications with the primary telephone number, call detail records may be provided to the primary network billing system that may not charge for the services and to a billing system associated with the secondary device for appropriate billing.

20 Claims, 7 Drawing Sheets

FRAMEWORK FOR UNIFIED WIRELESS COMMUNICATIONS

BACKGROUND

Wireless communications devices and the networks that support them have proliferated greatly in recent years. Modern wireless communications networks may support millions of users and their devices and interface with many other wireless communications networks. An operator of a wireless communications network may sell usage of the network to a vendor that may offer wireless communications services on the operator's wireless communications network to customers. Communications services may then be provided to such customers using the operator's wireless communications network. One or more components of the operator's wireless communications network may provide call and/or communications data associated with the vendor's customers to the vendor for billing purposes.

The types of devices operating on wireless communications networks have also expanded. A typical user may now have two, three, or more devices capable of wireless communications. For simplicity, a user may wish to maintain a single number or identifier for multiple devices so that others may contact the user at any of the devices using that single number or identifier. It can be challenging to facilitate this capability when a user has devices associated with different networks. For example, due to separate provisioning and/or billing systems, it can be challenging to provide single-number contact capabilities to both a first user device provisioned and billed at a first wireless communications network and a second user device provisioned and billed at a second wireless communications network.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
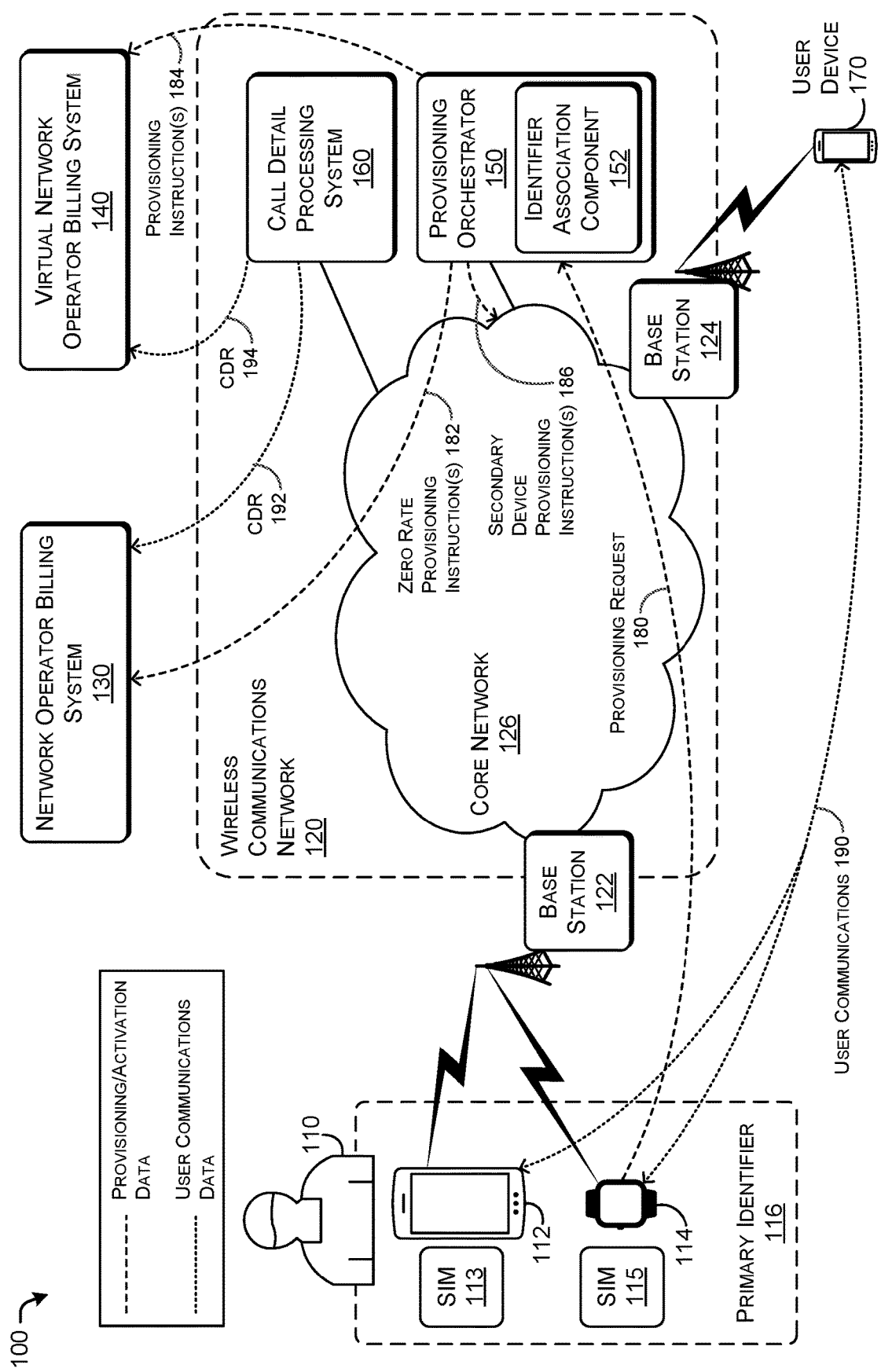
FIG. 1 is a schematic diagram of an illustrative wireless communication network environment in which systems and techniques may be implemented using a unified wireless communications framework, in accordance with examples of the disclosure.

This disclosure is directed in part to systems and techniques for implementing single number communications capabilities for communications of various types that may be initiated and/or received by multiple devices or user equipment (UEs) (e.g., smartphone, cell phone, mobile device, wireless communication device, mobile station, etc.) that may individually be associated with at least two distinct network operators associated with one or more advanced wireless communications networks. Such advanced networks include, but are not limited to, networks that support one or more 3GPP standards, including, but not limited to, Long Term Evolution (LTE) networks (e.g., 4G LTE networks) and New Radio (NR) networks (e.g., 5G NR networks); one or more IETF standards; one or more IEEE standards (e.g., any one or more of the IEEE 802.11 standards); and/or any other industry standards and/or specifications. However, the disclosed systems and techniques may be applicable in any combinations and types of networks and/or systems in which a user device may initiate, receive, or otherwise establish communications with another device or system using any protocol.

An individual user may own and/or use multiple wireless communications devices (UEs). For example, a user may have a smartphone, a smartwatch, a tablet computer, and a virtual reality headset. Each individual device may have a physical and/or logical subscriber identity module (SIM) (e.g., a SIM card or eSIM). A SIM configured on or otherwise associated with a device may include or indicate a unique identifier for that SIM, such as an integrated circuit card ID (ICCID). This identifier may be used by one or more wireless communications networks to uniquely identify the device at which the SIM is configured.

Each account with a wireless communications provider may be associated with or otherwise assigned an international mobile subscriber identity (IMSI). An individual user may have more than one account and/or accounts with more than one provider and therefore may be associated with more than one IMSI. In traditional implementations, a user may be provided with a contact identifier for each device operated by the user. This contact identifier may commonly take the form of a "telephone number" and may be a mobile station international subscriber directory number (MSISDN) or a subset thereof (e.g., the area code, prefix, and line number). However, an individual user with multiple devices may wish to have a single contact identifier (telephone number) that may be used with all such devices, even if such devices are associated with distinct network operators.

For example, a user may operate, as a primary device, a smartphone associated with a first account with a first network operator (e.g., an operator of a wireless communications network). This smartphone may have a SIM and an ICCID. The first account may be paid for and/or maintained by the user's employer (and may have its own associated IMSI). The user may wish to personally purchase or otherwise acquire a secondary device, such as a smartwatch that may also have its own SIM and unique ICCID. The user may set up a second account (e.g., with an associated IMSI) with a second network operator for the smartwatch. The second network operator may be a virtual network operator that resells communications services on the wireless communications network operated by the first network operator. Even though the smartwatch may be provided with its own telephone number by the second network operator, to facilitate ease of communicating with other devices and users, the user may wish to use the telephone number associated with the primary device (smartphone) to engage in communications using the secondary device (smartwatch). However, the user may wish to maintain separate accounts (and billings) for the two devices. This may be challenging in conventional systems using traditional techniques.

To address the inefficiencies and inconvenience of using multiple numbers for multiple devices that may be operated by a single user, one or more wireless network components may be configured to process device activation and/or provisioning requests, as well as user communications records and billing data, using a unified wireless communications framework implemented according to the systems and techniques described herein.

In various examples, a wireless communications network may generate and maintain one or more data structures that may map device identifiers (e.g., ICCIDs) to telephone numbers (e.g., MSISDNs or subsets thereof) and/or account numbers (e.g., IMSIs). In examples, such data structures may also, or instead, map device identifiers to other types of identifiers, such as IP addresses (e.g., IPv4 and/or IPv6 addresses) or other types of network addresses. One or more identifier association components may maintain this association data component and/or provide such data for communications and billing processing. An identifier association component and/or any of the functions associated therewith may be implemented as a dedicated (e.g., stand-alone) network component and/or at one or more network components that also perform other operations. In examples, the functions of an identifier association component may be distributed across multiple components. Such components may be physical and/or logical components.

In examples, one or more components of a wireless communications network may interact with an identifier association component to determine one or more devices to which to route a communications request received from a user device and destined for a particular telephone number. For example, such components may determine, using identifier association component and/or data determined therefrom, one or more particular ICCIDs that are associated with a telephone number that is included as a destination number in a communications request. The network components may then locate and transmit the communications request to the one or more devices using their respective ICCIDs.

One or more network components may track various attributes of initiated and/or completed communications sessions. A communications session may be any type of communications exchanged between two or more devices, including a voice call, a text message, a chat session, a video call, and any other type of data exchange. A wireless communications network may generate and maintain one or more data structures that may indicate billing data associated with a communications session, such as one or more device identifiers (e.g., ICCIDs) for the source and/or destination device, one or more telephone numbers or addresses (e.g., MSISDNs or subsets thereof, IP addresses, etc.) for the source and/or destination device, one or more account numbers (e.g., IMSIs) for the source and/or destination device, various call or communications attributes (e.g., call length, quantity of data exchanged/processed, type of data exchanged, associated quality of service (QOS) attributes, associated quality of experience (QoE) attributes, etc.). A data structure that represents such billing data may be referred to generally herein as a "call detail record" (CDR). One or more call detail processing systems may generate and maintain this call detail data for communications sessions on a network and/or provide such data to one or more billing systems for billing data processing. A call detail processing system and/or any of the functions associated therewith may be implemented as a dedicated (e.g., stand-alone) network component and/or at one or more network components that also perform other operations. In examples, the functions of a call detail processing system may be distributed across multiple components. Such components may be physical and/or logical components.

A call detail processing system may be configured to transmit CDRs to an appropriate billing system. In examples, a call detail processing system may determine an appropriate billing system based on information represented in a CDR. For example, a call detail processing system may use one or more device identifiers, telephone numbers or addresses, or account numbers (e.g., for the source and/or destination device) represented in a CDR to determine one or more billing systems. In some examples, more than one billing system may be associated with data in a CDR. For example, a telephone number in a CDR may be associated with a first billing system while a device identifier in the CDR may be associated with a second billing system. In such cases, the call detail processing system may transmit this CDR to one or both billing systems.

For example, when usage of a secondary device with a telephone number associated with a primary device as described herein generates a CDR, the call detail processing system may determine a billing system for the primary device and a billing system for the secondary device, for example, based on the telephone number associated with the primary device and a secondary device identifier represented in the CDR, respectively. The call detail processing system may then transmit the CDR to both billing systems.

In such examples, in response to receiving such a CDR, the first (primary) billing system associated with the telephone and the primary device may be configured (e.g., at secondary device provisioning as described in more detail below) with a "zero rate" service code or other configuration that causes the primary billing system to not generate a billing record for the secondary device and/or to otherwise generate billing records that result in no charge to the primary account (e.g., associated with the primary device). The second billing system associated with the secondary device, in response to receiving such a CDR, may be configured (e.g., at secondary device provisioning as described in more detail below) to generate a billing record and/or otherwise bill (e.g., normally) the secondary account (e.g., associated with the secondary device) based on the information in the CDR.

In other examples, the CDR may be sent by a call detail processing system to a primary billing system, for example, based on determining the primary account associated with the primary account telephone number represented in the CDR. The primary billing system may then determine that a secondary device is represented in the CDR, for example, based on the secondary device identifier represented in the CDR. In response, the primary billing system may forward or otherwise transmit the CDR to the secondary billing system associated with the secondary device for billing based on the CDR by the secondary billing system. The primary billing system may also, or instead, determine a zero rate service code for that CDR and generate no billing record and/or a zero charge billing record based on the CDR.

By implementing the disclosed systems and techniques within a unified wireless communications framework as described herein, a user may be provided with the capability to easily use one or more secondary devices with a telephone number or address associated with the user's primary device, even when the primary device is supported by a network operator distinct from the operator supporting one or more of the secondary devices. To establish this capability, various provisioning and/or activation operations may be used as described herein. Such activities may be coordinated or otherwise implemented via a provisioning orchestrator system as described herein.

In the various examples described herein, a primary device may be provisioned and activated. For example, the primary device may be associated with a telephone number ("primary" telephone number) and a primary account serviced by a primary billing system operated by a wireless communications network operator. The primary device will have its own SIM (e.g., SIM card or eSIM) that may indicate a unique device identifier (e.g., ICCID) for the primary device that may be associated with the device in various network components within the network operated by the wireless communications network operator and at the primary billing system.

A user associated with the primary device may acquire a secondary device from a different wireless communications network operator (e.g., other than the wireless communications network operator associated with the primary device and account, such as a virtual network operator). The user may wish to operate the secondary device using the primary telephone number associated with the primary account. The user may request activation of the secondary device and/or an association of the secondary device with the primary telephone number. For example, the user may interact with a user interface to request activation of the user device. The user may further interact with a user interface to request that one or more network components and/or systems be configured to "pair" or otherwise associate the secondary device with the primary telephone number.

For example, a user may acquire a secondary device from a virtual network operator reselling communications services on the wireless communications network that is currently supporting the user's primary device, where the primary device is associated with an account (and telephone number) serviced by primary operator of the wireless communications network. The user may request (e.g., via a user interface, a customer service representative for the virtual network operator, etc.) that an activation process for the secondary device be initiated that includes associating the secondary device with the telephone number associated with the primary device. Alternatively, the user may separately request that the secondary device be associated with the telephone number associated with the primary device (e.g., at some time after initially activating the secondary device).

In response to an activation request, a system or component of the wireless communications network may generate a provisioning request for the secondary device. The provisioning request may be received at a provisioning orchestrator or system that may instruct the various components (e.g., network nodes) of the wireless communications network to route and process communications and other data for the secondary device. This portion of the provisioning process may configure the network to communicate and interoperate with the secondary device.

Further in response to the activation request and/or in response to a separate number association request, a system or component of the wireless communications network may generate an identifier association request for associating the secondary device and the primary telephone number. The identifier association request may be received at an identifier association component (e.g., from the provisioning orchestrators or systems and/or that may be part of the provisioning orchestrator or system) that may instruct the various components (e.g., network nodes) of the wireless communications network to route communications and data associated with the primary telephone number to the secondary device. This portion of the provisioning process may configure the network to transmit communications and data destined for the primary number to both the primary device and the secondary device.

The provisioning process may further include configuring the appropriate billing systems based on the secondary device activation. For example, in response to a separate number association request (e.g., included with and/or distinct from an activation request for the secondary device), the provisioning orchestrator may transmit instructions to the primary billing system to configure a zero rate service code and/or a zero charge billing configuration for the secondary device (e.g., for the ICCID or other identifier unique to the secondary device). The provisioning orchestrator may also transmit instructions to the secondary billing system to configure the agreed upon (e.g., with the user) or otherwise standard billing configuration for the secondary device. In some examples, the provisioning orchestrator may also, or instead, notify the secondary billing system that the secondary device has been activated and/or provisioned. The secondary billing system may then generate and/or activate the appropriate billing configuration for the secondary device (e.g., based on the purchase agreement and/or other parameters associated with the secondary device).

Once these provisioning operations have been completed, data and communications destined for the primary telephone number may now be duplicated to the secondary device as well as being provided to the primary device, enabling the user to use either device interchangeably with the primary telephone number. Moreover, the billing for each device will remain distinct, with billing for the primary device being performed by the primary billing system for communications involving the primary device and billing for the secondary device being performed by the secondary billing system for communications involving the secondary device, even when the same primary telephone number is used at both devices.

By facilitating the more efficient and convenient routing and billing for communications with multiple devices using a single telephone number, systems and methods described herein implementing a unified wireless communications framework can improve the performance and increase the efficiency of network resources (and therefore UE resources), while improving the user experience by ensuring that communications destined for a particular telephone number are provided to all devices intended to be used with that number and that billing for usage of such devices is efficiently and accurately processed. For example, the methods and systems described herein may be more efficient and/or more robust than conventional techniques utilizing two numbers, as they may increase the efficiency of UE and network resource utilization by automatically routing communications to two or more devices instead of requiring a user to operate two devices independently and/or call multiple numbers. This prevents the waste of resources that occurs when users are required to call multiple numbers to reach a destination user's preferred device (e.g., where the destination user may need to ask the initiating user to call a different number to use the preferred receiving device). This reduces the overall utilization of network resources communications by eliminating unnecessary resource utilization resulting from user number confusion. In addition to improving the efficiency of network and device resource utilization, the systems and methods described herein can provide more robust systems by, for example, making more efficient use of network devices and user devices by reducing unnecessary device and network operations, thereby freeing network and user device resources for more productive operations. Moreover, the systems and methods described provide cost savings and improve billing by ensuring that the appropriate billing systems are provided with CDRs so that customers may be accurately billed for communication services.

Illustrative environments, signal flows, and techniques for implementing systems and techniques for implementing a unified wireless communications framework are described below. However, the described systems and techniques may be implemented in other environments.

Illustrative System Architecture

FIG. 1 is a schematic diagram of an illustrative wireless network environment 100 in which the disclosed systems and techniques may be implemented. The environment 100 may include devices operated by or otherwise associated with a user 110. For example, the user 110 may operate a smartphone 112 as a primary device and a smartwatch 114 as a secondary device. The smartphone 112 may include a SIM 113 (e.g., SIM card or eSIM) that may be configured with a primary device identifier (e.g., ICCID) for the smartphone 112. The smartwatch 114 may include a SIM 115 (e.g., SIM card or eSIM) that may be configured with a secondary device identifier (e.g., ICCID) for the smartwatch 114. The smartphone 112 and the smartwatch 114 may be configured, or capable of being configured, to interact with the wireless communications network 120, for example to exchange communications with one or more remote devices.

The wireless communications network 120 may be any one or more networks that facilitate communications between devices of various types, such as computing devices and mobile devices (e.g., UEs). Various connections between devices in the network 120 may be wired, wireless, or a combination thereof. In various embodiments, the wireless communications network 120 may facilitate communications with one or more wireless devices, such as UEs. The wireless communications network 120 may facilitate voice and data communications using packet-based communications technologies between such wireless devices and devices on the Internet and/or one or more systems and devices external to the wireless communications network 120. For example, the wireless communications network 120 may facilitate communications between either or both of the smartphone 112 and the smartwatch 114 and the user device 170. In some examples, the user device 170 may communicate with the wireless communications network 120 from another network via one or more intermediate networks, transit providers, and/or one or more network interconnections (e.g., trunks). The wireless communications network 120 may facilitate such communications via base stations, such as base station 122 and/or base station 124 that may each be a gNodeB, an eNodeB, a NodeB, and/or a base transceiver station (BTS) of any type. Such communications may be exchanged between base stations by components of the core network 126 of the wireless communications network 120.

The wireless communications network 120 may include a provisioning orchestrator 150 that may perform one or more of the provisioning operations described herein and/or orchestrate or otherwise coordinate various provisioning operations that may be performed within a unified wireless communications framework. For example, the provisioning orchestrator 150 may configure and/or transmit instructions causing the configuration of one or more network components, nodes, devices, and/or systems (e.g., in the core network 126 of the wireless communications network 120 and/or any one or more other networks) to support providing in communications services to one or more UEs or other user devices, such as smartphone 112 and smartwatch 114.

The provisioning orchestrator 150 may include and/or interact with an identifier association component 152. The identifier association component 152 may generate and store data mapping or otherwise associate device identifiers to telephone numbers (e.g., maintain a data structure representing such a mapping and/or associations). The identifier association component 152 may also, or instead, instruct various components (e.g., network nodes) of the wireless communications network 120 (e.g., in the core network 126) to route communications and data associated with particular telephone numbers to particular devices.

The provisioning orchestrator 150 may further configure and/or transmit instructions causing the configuration of one or more billing systems to support the billing of one or more accounts for the communications services. For example, as part of the provisioning process, the provisioning orchestrator 150 may notify the appropriate billing systems that a particular device has been provisioned or otherwise activated. In some examples, such notifications may be sufficient for a billing system to begin receiving and processing CDRs for the activated device, while in other examples, the provisioning orchestrator 150 may transmit instructions and/or data that may be used by such billing systems to initiate billing for a device.

The provisioning orchestrator 150 may interact with multiple billing systems. For example, direct customers of the operator of the wireless communications network 120 may be billed via the network operator billing system 130. The communications services provided by the wireless communications network 120 may be resold by a virtual network operator. Customers of this virtual network operator may be billed via the virtual network operation billing system 140. A device associated with customers of either such operator may be provisioned on the wireless communications network 120 by the provisioning orchestrator 150. The provisioning orchestrator 150 may interact with the billing system(s) associated with such devices as described herein.

The wireless communications network 120 may include may also, or instead, include a call detail processing system 160. The call detail processing system 160 may represent any one or more systems or components configured to generate, receive, and/or transmit CDRs. For example, the call detail processing system 160 may determine CDRs for communications involving smartwatch 114 and/or smartphone 112 and may provide such CDRs to the appropriate billing system(s) as described herein.

As will be appreciated, the wireless communications network 120 may include many other devices, systems, components, nodes, functions, and connections, not all of which will be described herein. Any of the examples described herein may include any one or more of such devices, systems, components, functions, and connections and/or one or more operations performed thereby.

The user 110, operating smartphone 112 and the user's primary device, may acquire the smartwatch 114 from a virtual network operator as a secondary device and may wish to use the primary telephone number associated with the smartphone 112 (represented as primary identifier 116 in FIG. 1) with the smartwatch 114. The smartphone 112 may have been acquired from the network operator of the wireless communications network 120. The network operator of the wireless communications network 120 may be associated with the network operator billing system 130 while the virtual network operator may be associated with the virtual network operator billing system 140. Thus, the billing functions that generate bills for the user 110 for operation of the smartphone 112 may be performed at the network operator billing system 130, while the billing functions that generate bills for the user 110 for operation of the smartwatch 114 may be performed at the virtual network operator billing system 140. Note that while the examples described herein may use a smartphone as a primary device and a smartwatch as a secondary device, any type of device having suitable capabilities may be used as either a primary or secondary device in the disclosed unified wireless communications framework, and a primary device may be associated with any number of secondary devices.

The user 110 (e.g., via a user interface, customer service representative, etc.) may request activation of the smartwatch 114 and association of the smartwatch 114 with the primary identifier 116. This request may generate the provisioning request 180. While shown in FIG. 1 as originating at the smartwatch 114, the provisioning request 180 may also, or instead, be generated by a system associated with the virtual network operator reselling communications services on the wireless communications network 120 (e.g., via a user interface associated such a system, a customer service representative for the virtual network operator, etc.). The provisioning request 180 may include, or may be, a request to associate the smartwatch 114 with the primary identifier 116 (e.g., the telephone number associated with the primary device smartphone 112).

In response to the provisioning request 180, the provisioning orchestrator 150 may configure the identifier association component 152 to associate the smartwatch 114 and the primary identifier 116. This may be accomplished by the provisioning orchestrator 150 directly configuring the identifier association component 152, requesting such a configuration from the identifier association component 152, etc. The identifier association component 152 may generate and store a mapping in response that maps the device identifier for the smartwatch 114 (e.g., as represented in the SIM 115) and the primary identifier 116. The identifier association component 152 and/or the provisioning orchestrator 150 may provide this mapping and/or related data to the various components (e.g., network nodes) of the wireless communications network 120 (e.g., the core network 126) so that communications and data associated with the primary identifier 116 may be duplicated to the smartwatch 114.

Further in response to the provisioning request 180, the provisioning orchestrator 150 may transmit one or more secondary device provisioning instructions 186 to various components (e.g., network nodes) of the wireless communications network 120, and in particular to components of the core network 126, to route and process communications and other data for the secondary device. In examples, the secondary device provisioning instruction(s) 186 may include data indicating the mapping or association of the device identifier for the smartwatch 114 and the primary identifier 116.

Also in response to the provisioning request 180, the provisioning orchestrator 150 may transmit zero rate provisioning instructions 182 to the network operating system 130 to configure a zero rate service code and/or a zero charge billing configuration for the smartwatch 114 (e.g., for the ICCID or other identifier unique to the secondary device). The provisioning orchestrator 150 may also transmit provisioning instructions 184 to the virtual network operator billing system 140 to configure the agreed upon (e.g., with the user) or otherwise standard billing configuration for the secondary device. In some examples, the provisioning instructions 184 may simply notify the virtual network operator billing system 140 that the smartwatch 114 has been activated and/or provisioned. The virtual network operator billing system 140 may then generate and/or activate the appropriate billing configuration for the smartwatch 114 (e.g., based on the purchase agreement and/or other parameters associated with the secondary device).

Once these provisioning operations have been completed, data and communications destined for the primary identifier 116 may now be duplicated to the smartwatch 114 as well as being provided to the smartphone 112, with appropriate billing operations being performed as needed. For example, a communications session may be established and successfully completed between the smartwatch 114 and the user device 170, represented as user communications 190 in FIG. 1. Data associated with the user communications 190 may be captured and/or determined by the call detail processing system 160 to generate one or more CDRs associated with the user communications 190. Note that the user communications 190 may also or instead be performed between the smartphone 112 and the user device 170 because the primary identifier 116 has been duplicated at the smartwatch 114 as well as being used at the smartphone 112.

The call detail processing system 160 may determine that the primary identifier 116 is associated with the user communications 190 and may therefore provide a CDR associated with the user communications 190 as CDR 192 to the network operator billing system 130. The call detail processing system 160 may also, or instead, determine that a device identifier associated with the smartwatch 114 is associated with the user communications 190 and may therefore provide a CDR associated with the user communications 190 as CDR 194 to the virtual network operator billing system 140. Alternatively, the network operator billing system 130 may determine that a device identifier associated with the smartwatch 114 is associated with the user communications 190 based on the CDR 192 and may, in response, provide the CDR 192 and/or data associated therewith to the virtual network operator billing system 140.

In response to receiving the CDR 192, the network operator billing system 130 may determine that a zero rate service code or other zero charge billing configuration is associated with the device identifier associated with the smartwatch 114 and may, in response, not generate billing data and/or generate no-charge billing data for the user communications 190 and/or based on the CDR 192.

In response to receiving the CDR 194 (or CDR data from the network operator billing system 130), the virtual network operator billing system 140 may generate a billing record associated with the user communications 190 and/or the CDR 194, and/or otherwise bill (e.g., normally) the account associated with the smartwatch 114 for the services associated with the user communications 190.

Illustrative Signal Flows

Figure 2:
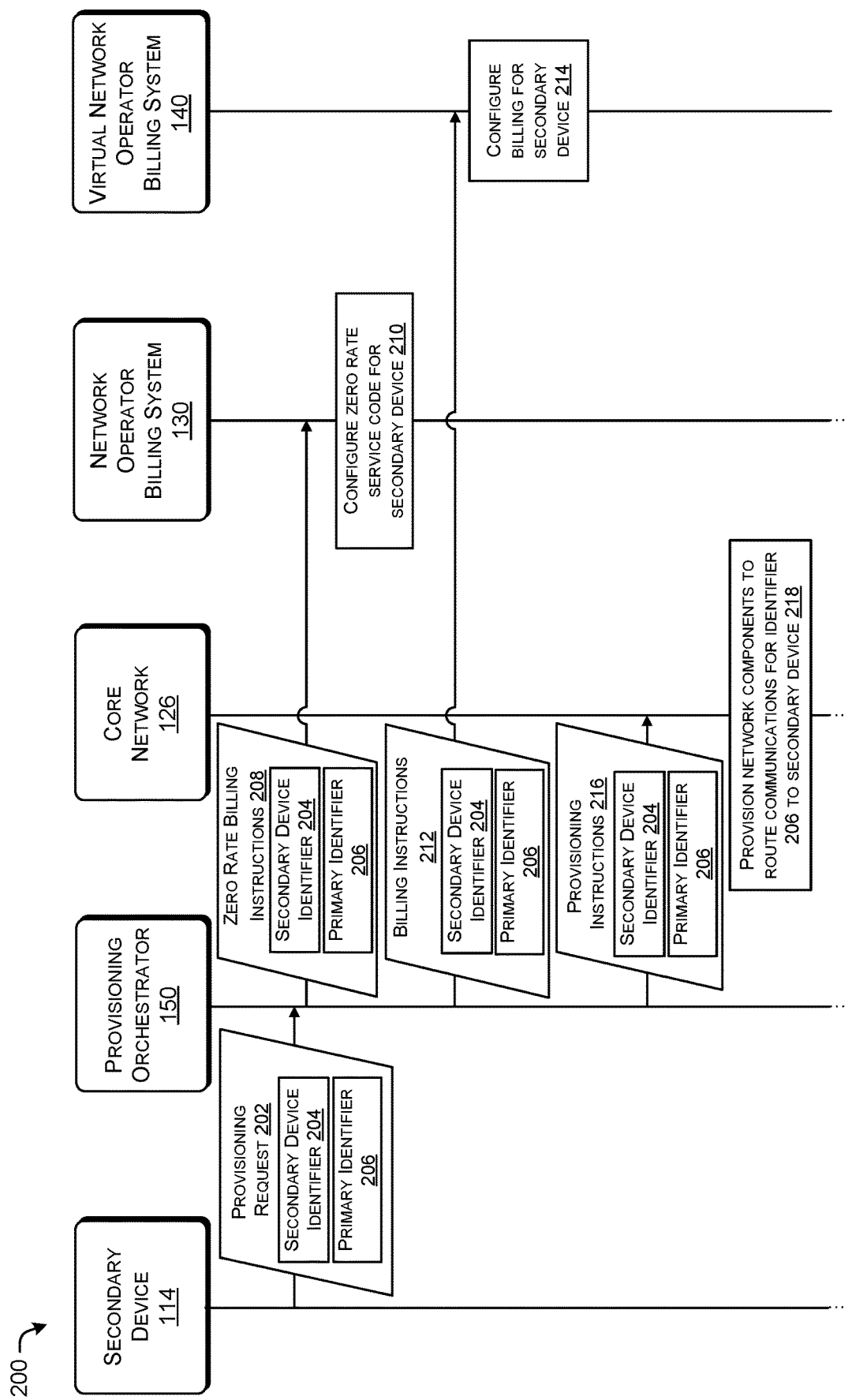
FIG. 2 is a diagram of an illustrative signal flow associated with systems and techniques for provisioning secondary devices using a unified wireless communications framework, in accordance with examples of the disclosure.

FIG. 2 illustrates an exemplary signal flow 200 of various messages that may be exchanged in one or more of the disclosed systems and techniques for unified wireless communications. Reference will be made in this description of the signal flow 200 to devices, entities, and interfaces illustrated in FIG. 1 and described in regard to that figure. However, the operations, signals, and signal flow illustrated in FIG. 2 and described herein may be implemented in any suitable system and/or with any one or more suitable devices and/or entities. Moreover, any of the operations, signals, and/or entities described in regard to FIG. 2 may be used separately and/or in conjunction with other operations, signals, and/or entities. All such embodiments are contemplated as within the scope of the instant disclosure.

Signal flow 200 illustrates an example of signals that may be exchanged and operations that may be performed to provision and/or activate a secondary device and to associate the secondary device with a primary identifier associated with a primary device, such as a telephone number associated with a primary UE (e.g., primary identifier 116). A secondary device 114 (e.g., smartwatch 114) may generate or otherwise cause the generation of a provisioning request 202. The provisioning request 202 may be transmitted to the provisioning orchestrator 150. The provisioning request 202 may include a secondary device identifier 204 that may be a unique identifier associated with the secondary device 114, such as an ICCID. The provisioning request 202 may also, or instead, include a primary identifier 206 that may be a primary number or address associated with a primary device or account and with which the user of the secondary device 114 would like to associate that device. For example, the primary identifier 206 may be a telephone number of the user's primary device (e.g., smartphone 112).

In response to the provisioning request 202, the provisioning orchestrator 150 may generate and transmit zero rate billing instructions 208 to the network operator billing system 130. The instructions 208 may include the secondary device identifier 204 and the primary identifier 206 and/or mapping data associated therewith. The instructions 208 may further include instructions to configure a zero rate service code and/or other zero charge billing configuration for services provided to the device associated with the secondary device identifier 204 and provided using the primary identifier 206. At operation 210, in response to the instructions 208, the network operator billing system 130 may configure a zero rate service code for the secondary device identifier 204 and/or the combination of the secondary device identifier 204 and the primary identifier 206.

Further in response to the provisioning request 202, the provisioning orchestrator 150 may generate and transmit billing instructions 212 to the virtual network operator billing system 140. The instructions 212 may include the secondary device identifier 204 and the primary identifier 206 and/or mapping data associated therewith. Alternatively, the instructions 212 may not include the primary identifier 206 as this may not be needed by the virtual network operator billing system 140 to generate billing data for the secondary device 114. The billing instructions 212 may simply notify the virtual network operator billing system 140 that the secondary device 114 has been activated and/or provisioned and/or may provide additional data that the virtual network operator billing system 140 may use to activate the appropriate billing configuration for the secondary device 114 (e.g., based on the purchase agreement and/or other parameters associated with the secondary device). At operation 214, the virtual network operator billing system 140 may configure and/or otherwise activate billing for the secondary device 114.

Further in response to the provisioning request 202, in some examples upon confirmation that billing has been successfully configured for the combination of the secondary device identifier 204 and the primary identifier 206, the provisioning orchestrator 150 may generate and transmit provisioning instructions 216 to the core network 126. The instructions 216 may include the secondary device identifier 204 and the primary identifier 206 and/or mapping data associated therewith. In examples, the instructions 216 may represent instructions to enable the components of the core network 126 to route and process communications and other data for the secondary device 114 as well as instructions to map and duplicate data and communications associated with the primary identifier 206 to the secondary device identifier 204 (e.g., send such data and communications to the secondary device 114). At operation 218, one or more components within the core network 126 may be configured to provide communications services to the secondary device 114 and associate communications and data destined for the primary identifier 206 with the secondary device identifier 204 (transmit communications and data destined for the primary identifier 206 to the secondary device 114).

Figure 3:
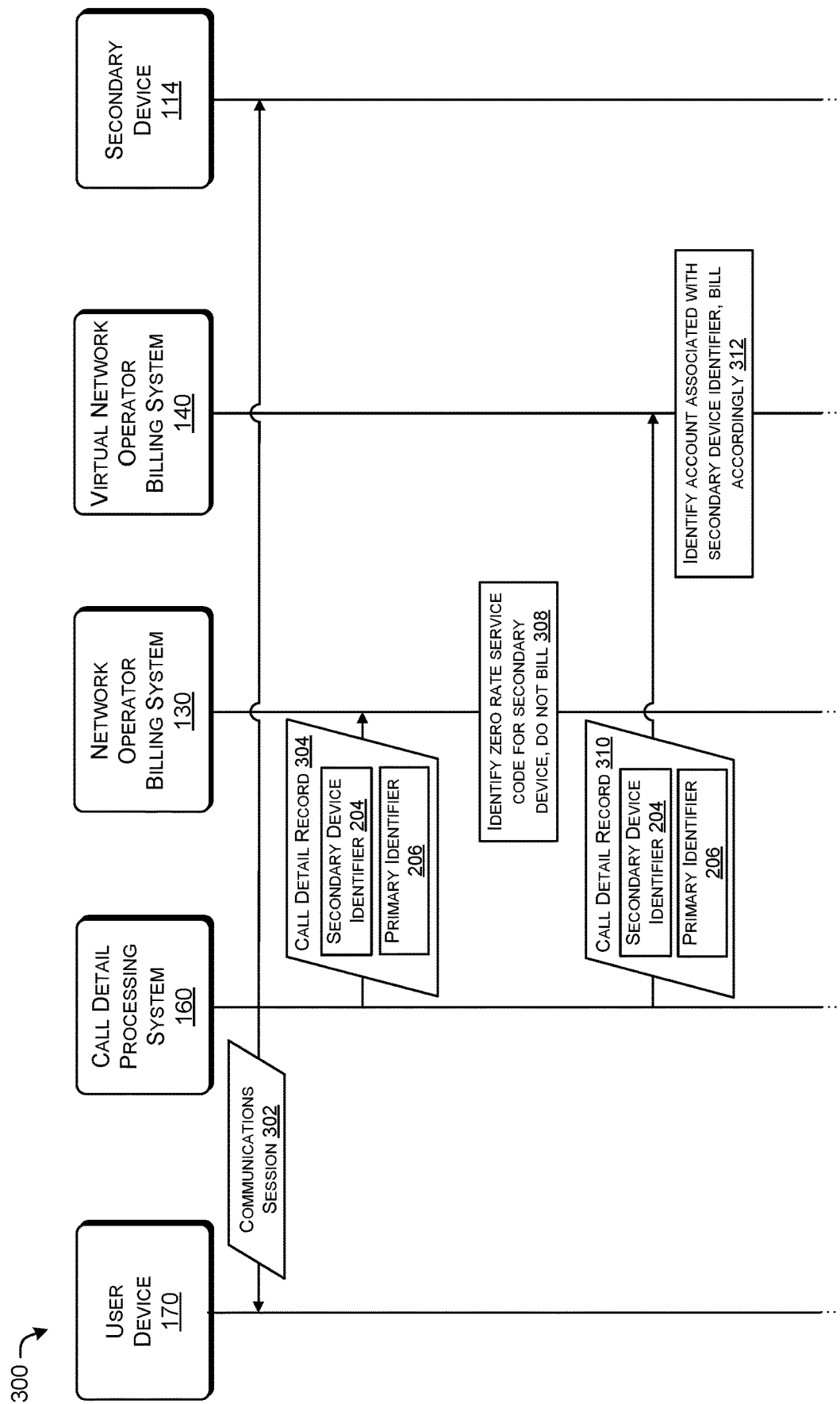
FIG. 3 is a diagram of an illustrative signal flow associated with systems and techniques for routing and billing communications associated with secondary devices using a unified wireless communications framework, in accordance with examples of the disclosure.

FIG. 3 illustrates an exemplary signal flow 300 of various messages that may be exchanged in one or more of the disclosed systems and techniques for single number communications accessibility. Reference will be made in this description of the signal flow 300 to devices, entities, and interfaces illustrated in FIG. 1 and described in regard to that figure, as well as signals, data, and operations illustrated in FIG. 2 and described in regard to that figure. However, the operations, signals, and signal flow illustrated in FIG. 3 and described herein may be implemented in any suitable system and/or with any one or more suitable devices and/or entities. Moreover, any of the operations, signals, and/or entities described in regard to FIG. 3 may be used separately and/or in conjunction with other operations, signals, and/or entities. All such embodiments are contemplated as within the scope of the instant disclosure.

Signal flow 300 illustrates an example of signals that may be exchanged and operations that may be performed to facilitate user communications for the secondary device 114 described above using the primary identifier 206 described in regard to FIG. 2 (e.g., the primary number or address associated with a primary device or account, such as a telephone number of the user's primary device (e.g., smartphone 112)). A communications session 302 between a user device 170 and the secondary device 114 may be initiated, established, conducted, and completed. This communications session 302 may have been directed at or otherwise associated with the primary identifier 206 and conducted using the secondary device 114 that may have been mapped to the primary identifier 206 as described above.

On completion of the communications session 302, the call detail processing system 160 may capture and/or determine call detail data for the communications 302 and generate a call detail record 304 (CDR 304). The CDR 304 may include any call detail record data, including data representing the secondary device identifier 204 and the primary identifier 206. The call detail processing system 160 may transmit the CDR 304 to the network operator billing system 130 (e.g., by default and/or based on determining that the primary identifier is associated with the network operator billing system 130).

At operation 308, the network operator billing system 130 may determine that a zero rate service code is associated with the secondary device identifier 204 and/or the combination of the secondary device identifier 204 and the primary identifier 206. Based on this determination, further at operation 308 the network operator billing system 130 may generate no billing record or data for the communications session 302 and/or may generate no-charge billing data for the communications session 302.

Further on completion of the communications session 302, the call detail processing system 160 may capture and/or determine call detail data for the communications 302 and generate (e.g., another) a CDR 310. The CDR 310 may include any call detail record data, including data representing the secondary device identifier 204 and the primary identifier 206. The CDR 310 may be the same CDR as the CDR 304 or may be a different CDR, for example, intended for the virtual network operator billing system 140. The call detail processing system 160 may determine to generate and transmit the CDR 310 based on the secondary device identifier that may be associated with the virtual network operator associated with the virtual network operator billing system 140 in data stored at the call detail processing system 160. The call detail processing system 160 may transmit the CDR 310 to the virtual network operator billing system 140.

At operation 312, the virtual network operator billing system 140 may determine a rate, plan, service charges, etc. associated with the secondary device identifier 204 and/or the combination of the secondary device identifier 204 and the primary identifier 206. Based on this determination, further at operation 312 the virtual network operator billing system 140 may generate a billing record or data for the communications session 302.

Illustrative Operations

Figure 4:
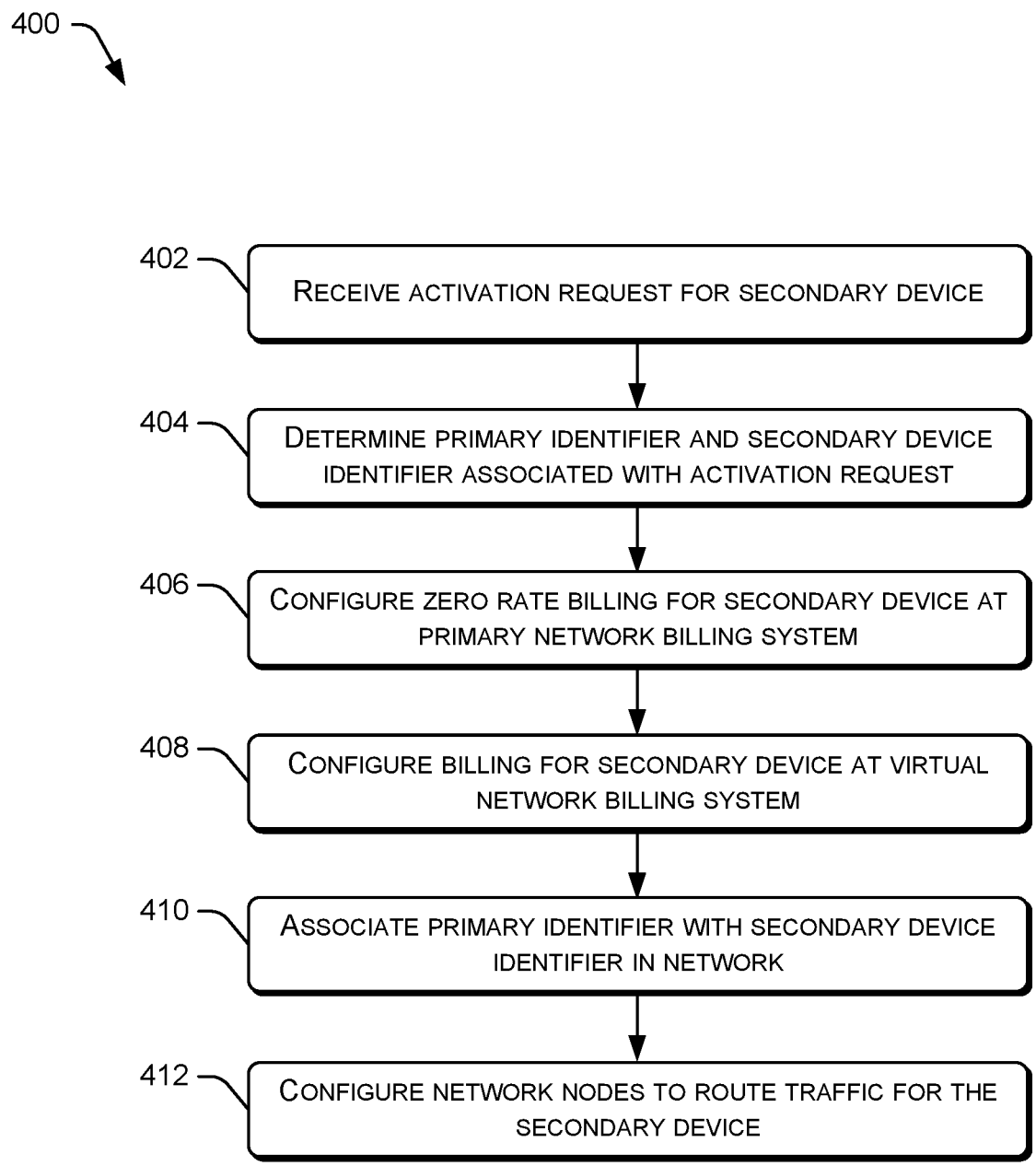
FIG. 4 is a flow diagram of an illustrative process for provisioning secondary devices within a system using a unified wireless communications framework, in accordance with examples of the disclosure.

FIG. 4 shows a flow diagram of an illustrative process 400 for provisioning a secondary device and associating the secondary device with a primary identifier (e.g., number, address) according to the disclosed embodiments. The process 400 is illustrated as a collection of blocks in a logical flow diagram, which represents a sequence of operations that can be implemented in software and executed in hardware. In the context of software, the blocks represent computer-executable instructions that, when executed by one or more processors, perform the recited operations. Generally, computer-executable instructions include routines, programs, objects, components, data structures, and the like that perform functions and/or implement particular abstract data types. The order in which the operations are described is not intended to be construed as a limitation, and any number of the described blocks can be omitted and/or combined in any order and/or in parallel to implement the processes. For discussion purposes, the process 400 may be described with reference to the wireless network environment 100 of FIG. 1; however other environments may also be used.

At block 402, an activation request may be received at a system, such as the provisioning orchestrator 150 and/or a system or component of the wireless communications network 120. This activation request may include an indication of a secondary device (e.g., a device identifier, such as an ICCID) and an indication of a primary identifier (e.g., a telephone number associated with a primary device or account) with which the secondary device is to be associated.

In response to the activation request received at block 402, at block 404 the system may determine the primary identifier and the secondary device identifier. The system may further generate local mapping and/or association data based on the requested mapped primary identifier and secondary device identifier.

At block 406, the system may transmit instructions to a primary network billing system to configure a zero rate service code and/or a zero charge billing configuration for the secondary device (e.g., for the ICCID of the secondary device and/or for the combination of a secondary device identifier and a primary identifier).

At block 408, the system may also, or instead, transmit instructions to the virtual network billing system to configure or initiate billing for the secondary device. As noted, this may take the form of a simple notification that the secondary device has been activated or may include transmitting more detailed information to the virtual network billing system.

At block 410, the system may associate the primary identifier and the secondary device identifier in a network by, for example, transmitting instructions to the various nodes in the network to route traffic for the primary identifier to the secondary device (e.g., in addition to routing such traffic to the primary device).

At block 412, the system may also perform any other configurations in the network that may need to be performed to support the secondary device by, for example, transmitting instructions to the various nodes in the network to route traffic for the secondary device (e.g., generally).

Figure 5:
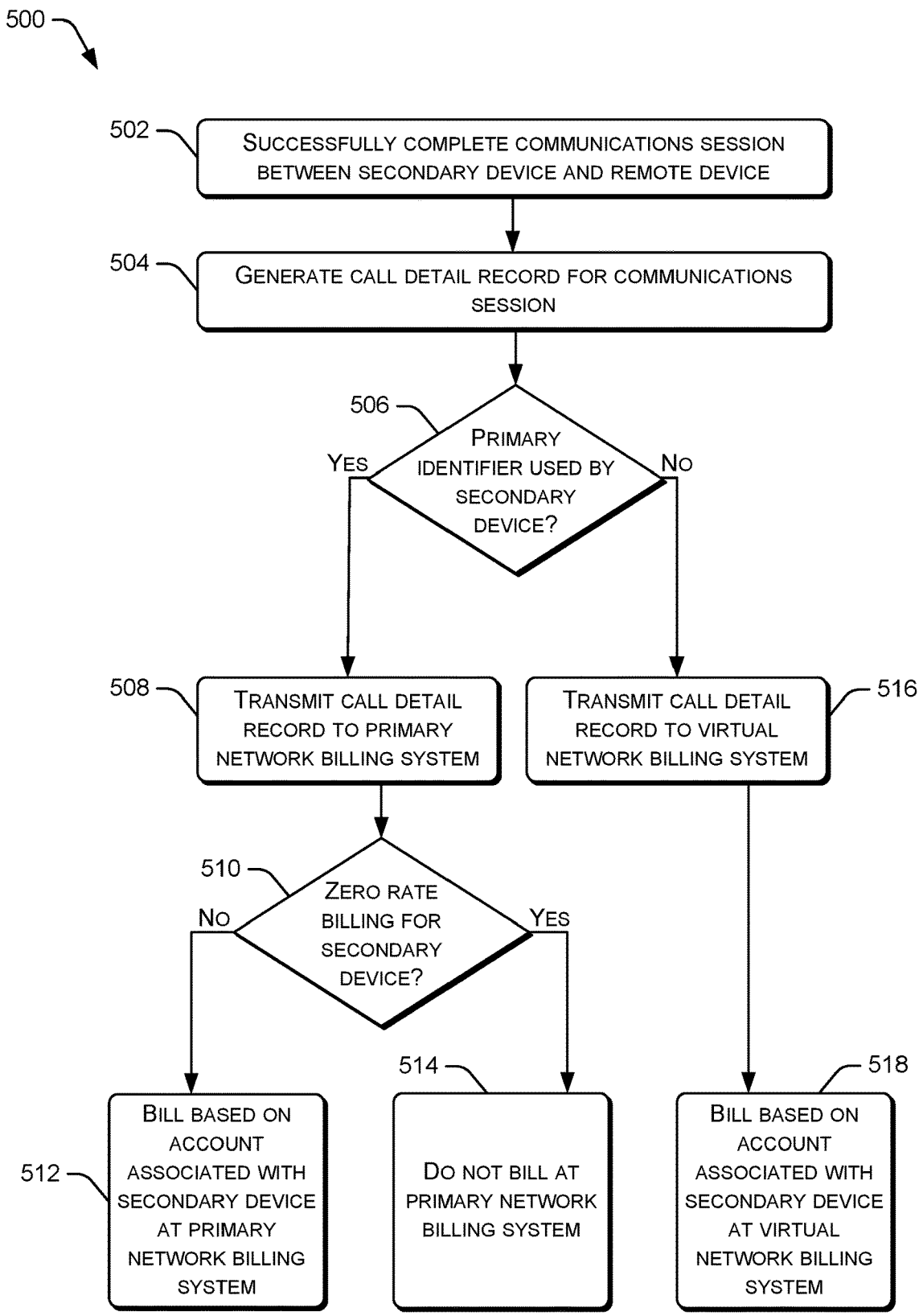
FIG. 5 is a flow diagram of an illustrative process for routing and billing communications associated with secondary devices within a system using a unified wireless communications framework, in accordance with examples of the disclosure.

FIG. 5 shows a flow diagram of an illustrative process 500 for providing communications to a secondary device using a primary identifier or a secondary device identifier (e.g., telephone number, address, etc. associated with secondary device) and billing such communications appropriately according to the disclosed embodiments. The process 500 is illustrated as a collection of blocks in a logical flow diagram, which represents a sequence of operations that can be implemented in software and executed in hardware. In the context of software, the blocks represent computer-executable instructions that, when executed by one or more processors, perform the recited operations. Generally, computer-executable instructions include routines, programs, objects, components, data structures, and the like that perform functions and/or implement particular abstract data types. The order in which the operations are described is not intended to be construed as a limitation, and any number of the described blocks can be omitted and/or combined in any order and/or in parallel to implement the processes. For discussion purposes, the process 500 may be described with reference to the wireless network environment 100 of FIG. 1; however other environments may also be used.

At block 502, the system may determine that a communications session may be completed between a secondary device and another remote device using a primary identifier (e.g., primary telephone number) that has been associated with the secondary device. At block 504, data associated with the communications session may be captured and/or determined by the system (e.g., by a call detail processing system or component) to generate one or more CDRs associated with the session. The CDR(s) may include data representing the secondary device identifier, the remote device, and the primary identifier.

At block 506, the system may determine whether the identifier associated with the secondary device in the CDR is a primary identifier associated with a primary network billing system or an identifier associated with the secondary device and a virtual network billing system (e.g., originally assigned to or otherwise configured at the secondary device).

If, at block 506, the system determines that the identifier associated with the secondary device in the CDR is a primary identifier and/or otherwise associated with a primary network billing system, based on the primary identifier and/or by default, the system may provide the CDR to a primary network billing system at block 508. Based on the CDR data, the primary network billing system may determine, at block 510, if the CDR is associated with a zero rate billing service code or otherwise associated with no-charge billing. For example, the primary network billing system may determine, based on the secondary device identifier and/or the combination of the secondary device identifier and primary identifier, whether the CDR is associated with a zero rate service code.

If the CDR is not associated with a zero rate service code, at block 512 the primary network billing system may bill the communications associated with the CDR normally (e.g., based on the service plan or billing configuration associated with the secondary device identifier and/or primary identifier).

If the CDR is associated with a zero rate service code, at block 514 the primary network billing system may not bill the communications associated with the CDR and/or may generate one or more no-charge billing records for the associated communications.

If, at block 506, the system determines that the identifier associated with the secondary device in the CDR is not a primary identifier and/or otherwise is associated with a virtual network billing system, based on the secondary device identifier and/or the combination of the secondary device identifier and the primary identifier, the system may also provide the CDR to a virtual network billing system at block 516. Based on the CDR data, the virtual network billing system may determine, at block 518, the applicable service plan or billing configuration associated with the secondary device identifier and perform the corresponding billing activities.

In summary, by more efficiently and conveniently implementing and facilitating the association of multiple devices with a single telephone number while maintaining distinct billing processes for the individual devices, the disclosed systems and techniques may be able to increase the ease of usage of telecommunications devices and systems and increase the efficiency of network and user device operations, improving the user experience and performance of both the network and user devices.

Example User Equipment

Figure 6:
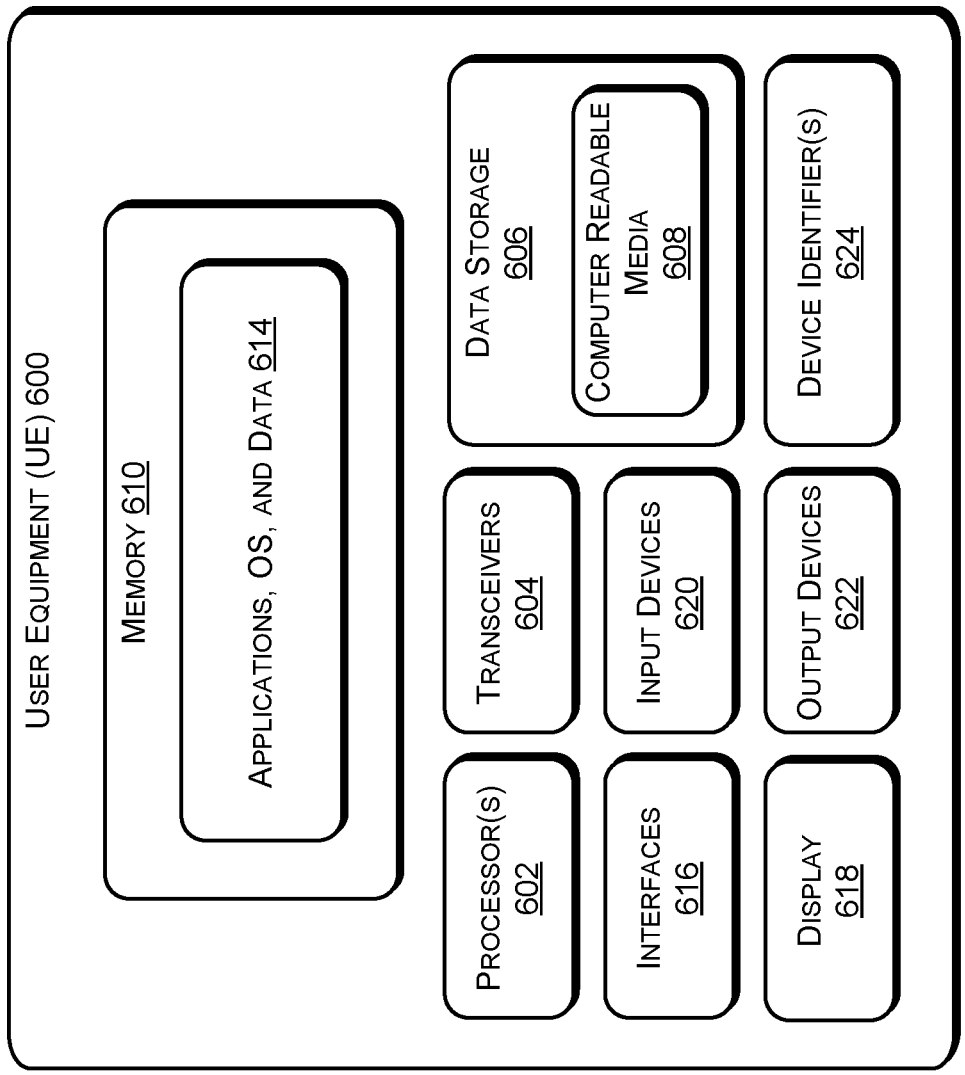
FIG. 6 is a schematic diagram of illustrative components in an example user device that may be configured for use in a system using a unified wireless communications framework, in accordance with examples of the disclosure.

FIG. 6 illustrates exemplary UE 600, which may be a UE such as smartphone 112, smartwatch 114, or user device 170, for use with the systems and methods disclosed herein, in accordance with some examples of the present disclosure. The UE 600 may include one or more processors 602, one or more transmit/receive antennas (e.g., transceivers or transceiver antennas) 604, and a data storage 606. The data storage 606 may include a computer readable media 608 in the form of memory and/or cache. This computer-readable media may include a non-transitory computer-readable media. The processor(s) 602 may be configured to execute instructions, which can be stored in the computer readable media 608 and/or in other computer readable media accessible to the processor(s) 602. In some configurations, the processor(s) 602 is a Central Processing Unit (CPU), a Graphics Processing Unit (GPU), or both CPU and GPU, or any other sort of processing unit. The transceiver antenna(s) 604 can exchange signals with a base station, such as base station 148.

The UE 600 may be configured with a memory 610. The memory 610 may be implemented within, or separate from, the data storage 606 and/or the computer readable media 608. The memory 610 may include any available physical media accessible by a computing device to implement the instructions stored thereon. For example, the memory 610 may include, but is not limited to, RAM, ROM, EEPROM, a SIM card, flash memory or other memory technology, CD-ROM, DVD or other optical disk storage, magnetic cassettes, magnetic tape, magnetic disk storage or other magnetic storage devices, or any other medium which may be used to store the desired information and which may be accessed by the UE 600.

The memory 610 can store several modules, such as instructions, data stores, and so forth that are configured to execute on the processor(s) 602. In configurations, the memory 610 may also store one or more applications 614 configured to receive and/or provide voice, data, and messages (e.g., SMS messages, Multi-Media Message Service (MMS) messages, Instant Messaging (IM) messages, Enhanced Message Service (EMS) messages, etc.) to and/or from another device or component (e.g., the base station 148). The applications 614 may also include one or more operating systems and/or one or more third-party applications that provide additional functionality to the UE 600.

Although not all illustrated in FIG. 6, the UE 600 may also comprise various other components, e.g., a battery, a charging unit, one or more network interfaces 616, an audio interface, a display 618, a keypad or keyboard, and one or more input devices 620, and one or more output devices 622. The UE 600 may further include one or more device identifiers 624 that may include one or more ICCIDs, MSISDNs, IMSIs, telephone numbers, etc. configured to facilitate communications between the UE 600 and one or more remote devices, as described herein for operations and components configured within a unified wireless communications framework.

Example Computing Device

Figure 7:
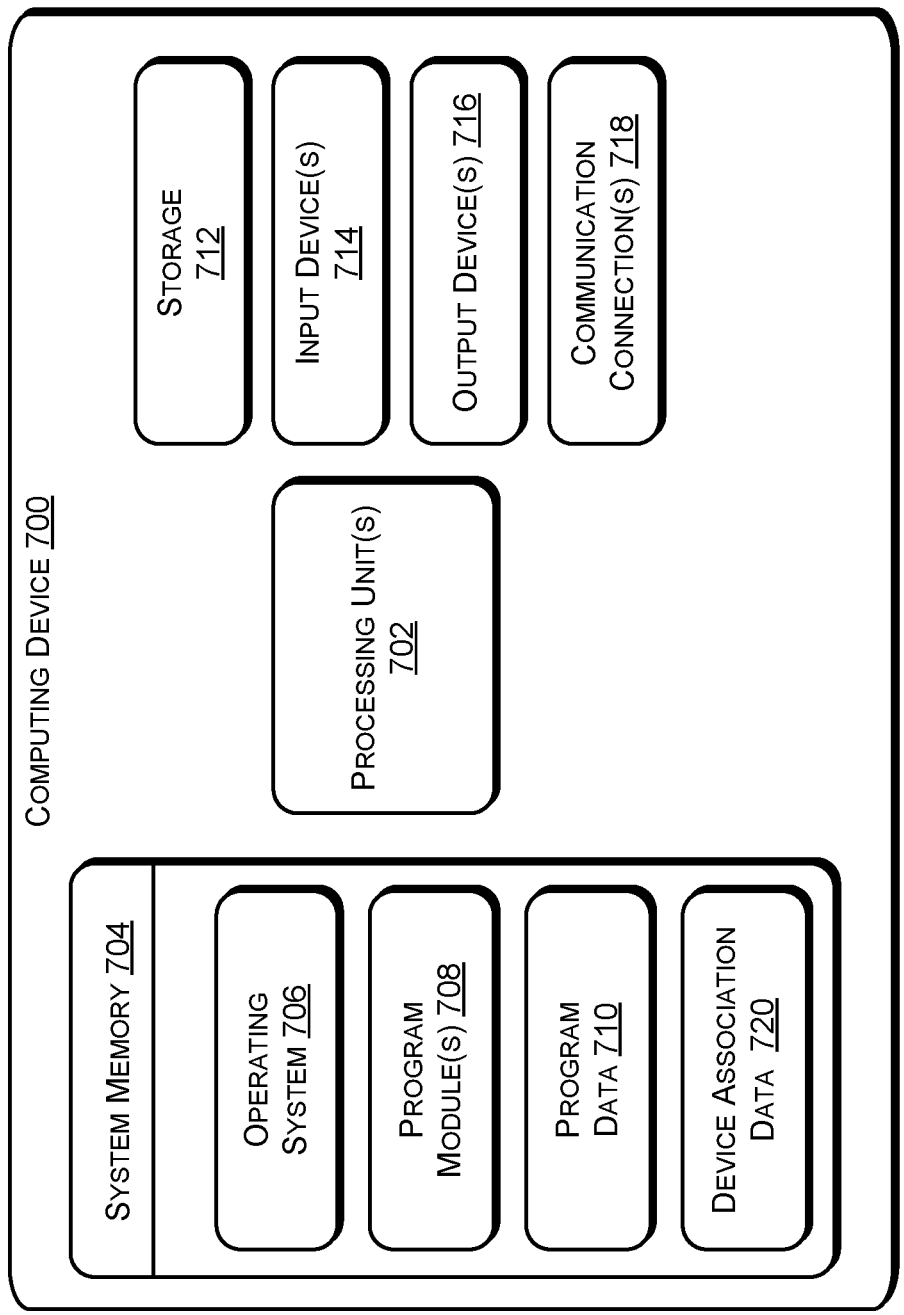
FIG. 7 is a schematic diagram of illustrative components in an example computing device that may be configured in a system using a unified wireless communications framework, in accordance with examples of the disclosure.

FIG. 7 is an example of a computing device 700 for use with the systems and methods disclosed herein, in accordance with some examples of the present disclosure. The computing device 700 can be used to implement various components of a core network, a base station, and/or any servers, routers, gateways, gateway elements, administrative components, etc. that can be used by a communication provider. One or more computing devices 700 can be used to implement the network 120, for example. One or more computing devices 700 can also be used to implement base stations and other components. One or more computing devices 700 can be used to implement the provisioning orchestrator 150, as another example.

In various embodiments, the computing device 700 can include one or more processing units 702 and system memory 704. Depending on the exact configuration and type of computing device, the system memory 704 can be volatile (such as RAM), nonvolatile (such as ROM, flash memory, etc.) or some combination of the two. The system memory 704 can include an operating system 706, one or more program modules 708, program data 710, and device association data 720 (e.g., device identifier and telephone number mapping and/or association data). The system memory 704 may be secure storage or at least a portion of the system memory 704 can include secure storage. The secure storage can prevent unauthorized access to data stored in the secure storage. For example, data stored in the secure storage can be encrypted or accessed via a security key and/or password.

The computing device 700 can also include additional data storage devices (removable and/or non-removable) such as, for example, magnetic disks, optical disks, or tape. Such additional storage is illustrated in FIG. 7 by storage 712.

Non-transitory computer storage media of the computing device 700 can include volatile and nonvolatile, removable and non-removable media implemented in any method or technology for storage of information, such as computer readable instructions, data structures, program modules, or other data. The system memory 704 and storage 712 are examples of computer readable storage media. Non-transitory computer readable storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by computing device 700. Any such non-transitory computer readable storage media can be part of the computing device 700.

In various embodiment, any or all of the system memory 704 and storage 712 can store programming instructions which, when executed, implement some or all of the functionality described above as being implemented by one or more systems configured in the environment 100 and/or components of the network 120.

The computing device 700 can also have one or more input devices 714 such as a keyboard, a mouse, a touch-sensitive display, voice input device, etc. The computing device 700 can also have one or more output devices 716 such as a display, speakers, a printer, etc. can also be included. The computing device 700 can also contain one or more communication connections 718 that allow the device to communicate with other computing devices using wired and/or wireless communications.

Example Clauses

The following paragraphs describe various examples. Any of the examples in this section may be used with any other of the examples in this section and/or any of the other examples or embodiments described herein.

A: A method comprising: receiving, at a provisioning system configured at a wireless communications network, a request to provision communications service for a first user equipment (UE), the request comprising a request to associate the first UE with a primary identifier that is associated with a second UE distinct from the first UE; mapping, at the provisioning system and based at least in part on the request, the primary identifier to a first UE identifier; transmitting, from the provisioning system to a plurality of network nodes in the wireless communications network and based at least in part on the request, first instructions to route traffic associated with the primary identifier to the first UE; transmitting, from the provisioning system to a network operator billing system associated with the wireless communications network and based at least in part on the request, instructions to configure a zero rate service code for communications associated with the traffic associated with the primary identifier and routed to the first UE; transmitting, from the provisioning system to a virtual network operator billing system associated with the first UE and based at least in part on the request, an indication that the first UE has been provisioned on the wireless communications network; generating, at a call detail processing system configured at the wireless communications network, a call detail record (CDR) in response to detecting a completion of a communications session associated with the first UE and the primary identifier; and transmitting, from the call detail processing system to the network operator billing system and the virtual network operator billing system, the CDR.

B: The method of paragraph A, wherein the primary identifier is a telephone number.

C: The method of paragraph A or B, wherein the first UE identifier is an integrated circuit card ID (ICCID).

D: The method of any of paragraphs A-C, further comprising: detecting a second request to initiate the communications session, the second request comprising a destination identifier comprising the primary identifier; and based at least in part on the mapping of the primary identifier to the first UE identifier, transmitting the second request to the first UE and the second UE.

E: The method of any of paragraphs A-D, wherein transmitting the call detail record comprises transmitting the CDR to both the network operator billing system and the virtual network operator billing system substantially simultaneously.

F: The method of any of paragraphs A-E, wherein transmitting the call detail record comprises transmitting the CDR to the network operator billing system, causing the network operator billing system to transmit the CDR to the virtual network operator billing system.

G: A wireless communications network system comprising: one or more processors; one or more transceivers; and non-transitory computer-readable media storing computer-executable instructions that, when executed by the one or more processors, cause the one or more processors to perform operations comprising: receiving a request to provision communications service for a first user equipment (UE), the request comprising a request to associate the first UE with a primary identifier that is associated with a second UE distinct from the first UE; mapping the primary identifier to a first UE identifier; transmitting, to a plurality of network nodes in the wireless communications network, first instructions to route traffic associated with the primary identifier to the first UE; transmitting, to a network operator billing system associated with the wireless communications network, instructions to configure a zero rate service code for communications associated with the traffic associated with the primary identifier and routed to the first UE; transmitting, to a virtual network operator billing system associated with the first UE, an indication that the first UE has been provisioned on the wireless communications network; generating a call detail record in response to detecting a completion of a communications session associated with the first UE and the primary identifier; and transmitting the call detail record to the network operator billing system and the virtual network operator billing system.

H: The wireless communications network system of paragraph G, wherein the operations further comprise: receiving a second request to initiate the communications session from a third UE, wherein the second request comprises a destination identifier comprising the primary identifier; determining that the first UE identifier and a second UE identifier associated with the second UE are associated with the primary identifier; and based at least in part on determining that the first UE identifier and the second UE identifier are associated with the primary identifier, transmitting the second request to the first UE and the second UE.

I: The wireless communications network system of paragraph G or H, wherein the operations further comprise establishing the communications session between the third UE and the first UE.

J: The wireless communications network system of any of paragraphs G-I, wherein the first UE is one of: a smartwatch; a virtual reality headset; a tablet computer; or a smartphone.

K: The wireless communications network system of any of paragraphs G-J, wherein the virtual network operator billing system is associated with a virtual network operator providing communications services on the wireless communications network.

L: The wireless communications network system of any of paragraphs G-K, wherein the primary identifier is a network address.

M: The wireless communications network system of any of paragraphs G-L, wherein the first UE identifier is an integrated circuit card ID (ICCID).

N: The wireless communications network system of any of paragraphs G-M, wherein the primary identifier is a telephone number.

O: A non-transitory computer-readable media storing computer-executable instructions that, when executed by one or more processors, cause the one or more processors to perform operations comprising: receiving a request to activate communications service in a wireless communications network for a first user equipment (UE), the request comprising a request to associate the first UE with a primary identifier that is associated with a second UE distinct from the first UE; mapping the primary identifier to a first UE identifier; transmitting, to a plurality of network nodes in the wireless communications network, first instructions to route traffic associated with the primary identifier to the first UE; transmitting, to a network operator billing system associated with the wireless communications network, instructions to configure a zero rate service code for communications associated with the traffic associated with the primary identifier and routed to the first UE; transmitting, to a virtual network operator billing system associated with the first UE, an indication that the first UE has been activated; generating a call detail record in response to detecting a completion of a communications session associated with the first UE and the primary identifier; and transmitting the call detail record to the network operator billing system and the virtual network operator billing system.

P: The non-transitory computer-readable media of paragraph O, wherein the operations further comprise: receiving a second request to initiate the communications session from a third UE, wherein the second request comprises a destination identifier comprising the primary identifier; determining that the first UE identifier and a second UE identifier associated with the second UE are associated with the primary identifier; and based at least in part on determining that the first UE identifier and the second UE identifier are associated with the primary identifier, transmitting the second request to the first UE and the second UE.

Q: The non-transitory computer-readable media of paragraph P, wherein the operations further comprise establishing the communications session between the third UE and the first UE.

R: The non-transitory computer-readable media of any of paragraphs O-Q, wherein the virtual network operator billing system is associated with a virtual network operator providing communications services in the wireless communications network.

S: The non-transitory computer-readable media of any of paragraphs O-R, wherein the first UE identifier is an integrated circuit card ID (ICCID).

T: The non-transitory computer-readable media of claim 15, wherein the primary identifier is a telephone number.

While the example clauses described above are described with respect to one particular implementation, it should be understood that, in the context of this document, the content of the example clauses can also be implemented via a method, device, system, computer-readable medium, and/or another implementation. Additionally, any of the examples A-T can be implemented alone or in combination with any other one or more of the examples A T.

CONCLUSION

Depending on the embodiment, certain operations, acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, components, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks, modules, and components described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements, and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Unless otherwise explicitly stated, articles such as "a" or "the" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
   receiving, at a provisioning system configured at a wireless communications network, a request to provision communications service for a first user equipment (UE), the request comprising a request to associate the first UE with a primary identifier that is associated with a second UE distinct from the first UE;
   mapping, at the provisioning system and based at least in part on the request, the primary identifier to a first UE identifier;
   transmitting, from the provisioning system to a plurality of network nodes in the wireless communications network and based at least in part on the request, first instructions to route traffic associated with the primary identifier to the first UE;
   transmitting, from the provisioning system to a network operator billing system associated with the wireless communications network and based at least in part on the request, instructions to configure a zero rate service code for communications associated with the traffic associated with the primary identifier and routed to the first UE;
   transmitting, from the provisioning system to a virtual network operator billing system associated with the first UE and based at least in part on the request, an indication that the first UE has been provisioned on the wireless communications network;
   generating, at a call detail processing system configured at the wireless communications network, a call detail record (CDR) in response to detecting a completion of a communications session associated with the first UE and the primary identifier; and
   transmitting, from the call detail processing system to the network operator billing system and the virtual network operator billing system, the CDR.

2. The method of claim 1, wherein the primary identifier is a telephone number.

3. The method of claim 1, wherein the first UE identifier is an integrated circuit card ID (ICCID).

4. The method of claim 1, further comprising:
   detecting a second request to initiate the communications session, the second request comprising a destination identifier comprising the primary identifier; and
   based at least in part on the mapping of the primary identifier to the first UE identifier, transmitting the second request to the first UE and the second UE.

5. The method of claim 1, wherein transmitting the call detail record comprises transmitting the CDR to both the network operator billing system and the virtual network operator billing system substantially simultaneously.

6. The method of claim 1, wherein transmitting the call detail record comprises transmitting the CDR to the network operator billing system, causing the network operator billing system to transmit the CDR to the virtual network operator billing system.

7. A wireless communications network system comprising:
   one or more processors;
   one or more transceivers; and
   non-transitory computer-readable media storing computer-executable instructions that, when executed by the one or more processors, cause the one or more processors to perform operations comprising:
      receiving a request to provision communications service for a first user equipment (UE), the request comprising a request to associate the first UE with a primary identifier that is associated with a second UE distinct from the first UE;

mapping the primary identifier to a first UE identifier;

transmitting, to a plurality of network nodes in the wireless communications network, first instructions to route traffic associated with the primary identifier to the first UE;

transmitting, to a network operator billing system associated with the wireless communications network, instructions to configure a zero rate service code for communications associated with the traffic associated with the primary identifier and routed to the first UE;

transmitting, to a virtual network operator billing system associated with the first UE, an indication that the first UE has been provisioned on the wireless communications network;

generating a call detail record in response to detecting a completion of a communications session associated with the first UE and the primary identifier; and transmitting the call detail record to the network operator billing system and the virtual network operator billing system.

8. The wireless communications network system of claim 7, wherein the operations further comprise:

receiving a second request to initiate the communications session from a third UE, wherein the second request comprises a destination identifier comprising the primary identifier;

determining that the first UE identifier and a second UE identifier associated with the second UE are associated with the primary identifier; and based at least in part on determining that the first UE identifier and the second UE identifier are associated with the primary identifier, transmitting the second request to the first UE and the second UE.

9. The wireless communications network system of claim 8, wherein the operations further comprise establishing the communications session between the third UE and the first UE.

10. The wireless communications network system of claim 7, wherein the first UE is one of:

a smartwatch;

a virtual reality headset;

a tablet computer; or a smartphone.

11. The wireless communications network system of claim 7, wherein the virtual network operator billing system is associated with a virtual network operator providing communications services on the wireless communications network.

12. The wireless communications network system of claim 7, wherein the primary identifier is a network address.

13. The wireless communications network system of claim 7, wherein the first UE identifier is an integrated circuit card ID (ICCID).

14. The wireless communications network system of claim 7, wherein the primary identifier is a telephone number.

15. A non-transitory computer-readable media storing computer-executable instructions that, when executed by one or more processors, cause the one or more processors to perform operations comprising:

receiving a request to activate communications service in a wireless communications network for a first user equipment (UE), the request comprising a request to associate the first UE with a primary identifier that is associated with a second UE distinct from the first UE;

mapping the primary identifier to a first UE identifier;

transmitting, to a plurality of network nodes in the wireless communications network, first instructions to route traffic associated with the primary identifier to the first UE;

transmitting, to a network operator billing system associated with the wireless communications network, instructions to configure a zero rate service code for communications associated with the traffic associated with the primary identifier and routed to the first UE;

transmitting, to a virtual network operator billing system associated with the first UE, an indication that the first UE has been activated;

generating a call detail record in response to detecting a completion of a communications session associated with the first UE and the primary identifier; and transmitting the call detail record to the network operator billing system and the virtual network operator billing system.

16. The non-transitory computer-readable media of claim 15, wherein the operations further comprise:

receiving a second request to initiate the communications session from a third UE, wherein the second request comprises a destination identifier comprising the primary identifier;

determining that the first UE identifier and a second UE identifier associated with the second UE are associated with the primary identifier; and based at least in part on determining that the first UE identifier and the second UE identifier are associated with the primary identifier, transmitting the second request to the first UE and the second UE.

17. The non-transitory computer-readable media of claim 16, wherein the operations further comprise establishing the communications session between the third UE and the first UE.

18. The non-transitory computer-readable media of claim 15, wherein the virtual network operator billing system is associated with a virtual network operator providing communications services in the wireless communications network.

19. The non-transitory computer-readable media of claim 15, wherein the first UE identifier is an integrated circuit card ID (ICCID).

20. The non-transitory computer-readable media of claim 15, wherein the primary identifier is a telephone number.

* * * * *